(12) United States Patent
Baron

(10) Patent No.: US 6,466,742 B1
(45) Date of Patent: Oct. 15, 2002

(54) CAMERA REMOTE CONTROL

(75) Inventor: John M. Baron, Longmont, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/935,041

(22) Filed: Aug. 22, 2001

(51) Int. Cl.$^7$ .......................... G03B 13/36; G03B 17/00
(52) U.S. Cl. ........................ 396/59; 396/100; 396/121
(58) Field of Search ......................... 396/56–59, 100, 396/121–123, 106, 109, 147; 348/211, 169

(56) References Cited

U.S. PATENT DOCUMENTS

| | | | |
|---|---|---|---|
| 4,937,604 A | * 6/1990 | Yoshida et al. | 396/59 |
| 5,119,123 A | 6/1992 | Tominaga et al. | 354/402 |
| 5,159,375 A | 10/1992 | Taniguchi et al. | 354/400 |
| 5,172,155 A | 12/1992 | Kosaka | 354/403 |
| 5,235,376 A | * 8/1993 | Inoue et al. | 396/56 |
| 5,247,327 A | * 9/1993 | Suzuka et al. | 396/56 |
| 5,491,529 A | 2/1996 | Iwai et al. | 354/266 |
| 5,517,276 A | * 5/1996 | Higaki et al. | 396/56 |

FOREIGN PATENT DOCUMENTS

| | | | | |
|---|---|---|---|---|
| JP | 63237674 | 10/1988 | | H04N/5/232 |
| JP | 4326314 | 11/1992 | | G02B/7/28 |
| JP | 4371938 | 12/1992 | | G03B/13/36 |
| JP | 5002128 | 1/1993 | | G02B/7/32 |
| JP | 6075161 | 3/1994 | | G02B/7/28 |
| JP | 7159678 | 6/1995 | | G02B/7/32 |
| JP | 6130489 | 2/1996 | | G03B/17/38 |
| JP | 8122870 | 5/1996 | | G03B/17/00 |

* cited by examiner

*Primary Examiner*—W. B. Perkey
(74) *Attorney, Agent, or Firm*—David W. Boyd

(57) ABSTRACT

A camera system uses a "focus attracting" remote control. The remote control signals its position in the camera's field of view a by emitting a distinguishable light signal. The camera selects a focus region at the position indicated by the remote control and performs its automatic focus function. Objects in the vicinity of the remote control are sharply focused in the resulting photograph. The photograph can thus include the photographer, who is also a photographic subject, in good focus even though the photographer is positioned in the scene away from the center of the camera's field of view.

13 Claims, 7 Drawing Sheets

COLUMN NUMBER

X →

Y ↓ ROW NUMBER

| | 0 | 1 | 2 | 3 | 4 | 5 | 6 |
|---|---|---|---|---|---|---|---|
| 0 | 0 | 0 | 0 | 0 | 0 | 0 | 0 |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 82 | 86 | 0 | 0 | 0 | 0 |
| 5 | 0 | 0 | 0 | 0 | 0 | 0 | 0 |

FIG. 7

CAMERA REMOTE CONTROL

FIELD OF THE INVENTION

The present invention relates generally to photography, and more specifically to photography using a remote control to operate a camera from a distance.

BACKGROUND OF THE INVENTION

Many modern cameras allow the use of a remote control for initiating a photograph of a scene. This capability is especially useful when the photographer wishes to include himself in the photograph. In a typical case, the camera may be placed on a tripod or other stationary surface and positioned to view the desired scene. The photographer can move into position in the composed scene and then use the remote control to cause the camera to take the photograph. The remote control is often a small handheld unit that sends an infrared light signal when a button is pressed by the user. The signal is directed toward the camera that has a special sensor to detect the signal from the remote control.

In a simple embodiment, the camera performs exactly the same sequence of operations when taking a photograph under remote control as when the shutter release button on the camera is pressed by the user directly.

Many modern cameras also include automatic focusing capability. Typically the camera projects an image of a portion of the scene onto an electronic sensor and then moves some part of the camera optics in order to maximize the contrast of the image portion read by the sensor, thereby achieving focus. In a digital camera, the same electronic sensor may be used for focus determination as for taking the actual resulting photograph or separate sensors may be provided. In a film camera, the electronic sensor may be used for focusing and light metering, but is not involved in the actual taking of the photograph. Even in a film camera, the sensor may be capable of sensing one or more selected portions of the scene image.

Often, a scene contains a particular point of interest that the photographer wishes to ensure is in focus in a photograph. For example, when a photograph includes people, it is usually desirable for the people to be sharply focused.

Typically, a camera will use a small portion of a scene for determining focus. This "focus region" is often in the center of the camera's field of view. Some cameras allow the photographer to select a focus region at some other location besides the center of the camera's field of view to accommodate the situation where the point of interest in the scene is not in the center of the resulting photograph. When the focus region is aligned with the point of interest in the scene, the camera will be able to focus on the desired part of the scene and produce the desired photograph.

During automatic operation, a camera typically chooses a focus region in the center of its field of view. When the camera is being operated by a remote control, the photographer is at a distance from the camera, and therefore cannot view the scene through the camera's viewfinder nor operate the camera controls to select a different focus point.

This combination of circumstances can cause a difficulty in obtaining the desired or expected photographic result in some cases.

FIG. 2 depicts a scene that may cause difficulty when photographed with a camera under remote control. The camera focus region is indicated by brackets (202). During automatic operation, the camera will focus on the objects in the focus region. These objects are relatively distant from the camera. The photographer (201) operating the camera by remote control is outside the focus region and will not be taken into account during focusing. Being relatively closer to the camera, the photographer will be out of focus in the resulting photograph. Generally, it is preferable to have the person sharply focused in the photograph.

Several alternatives exist for causing the camera to take the desired photograph with the person in focus.

The photographer could disable the automatic focus capability of the camera and focus manually at the proper distance before positioning himself in the scene. However this technique is prone to error and compromises the convenience of having a camera with automatic focus capability.

Some camera systems have addressed this situation by various methods.

One method described in U.S. Pat. No. 5,119,123 limits the range of focus distances that the camera will consider when used with a remote control, and also sets the camera aperture to maximize the depth of field in the resulting photograph so as to increase the likelihood that the desired subject is in focus. However, this method limits the photographer's choices for scene composition and for creative photographic effects.

Another method described in Japanese Patent 04371938 has the camera warn the photographer when the focus distance determined automatically by the camera is greater than would likely occur during remote control operation. The photographer can then reposition himself and attempt the photograph again. However, this method limits the photographer's choices for scene composition and may require multiple attempts to obtain a successful photograph.

Still another method as described in Japanese Patents 63237674 and 07159678 uses the difference in arrival times of an infrared and an ultrasonic signal sent simultaneously by the remote control to calculate the distance between the remote control and the camera. This distance is then used to determine the lens position for proper focus. However, this method requires the added expense of two kinds of signaling paths and may be subject to errors when the remote control is significantly off-center in the camera field of view.

Other prior solutions may require multiple signaling devices or may be complex for the photographer to use.

What is needed is a simple, inexpensive system or method for causing a camera to reliably select the correct focus region when used with a remote control, while preserving the photographer's range of choices of scene composition and creative photographic effects.

SUMMARY OF THE INVENTION

A camera system uses a "focus attracting" remote control. The remote control signals its position in the camera's field of view by emitting a distinguishable light signal. The camera selects a focus region at the position indicated by the remote control and performs its automatic focus function. Objects in the vicinity of the remote control are sharply focused in the resulting photograph.

BRIEF DESCRIPTION OF THE DRAWINGS

FIG. 7 depicts the row and column numbering that the camera may use for locating the remote control light signal in its field of view.

DETAILED DESCRIPTION OF THE PREFERRED EMBODIMENT

Figure 1:
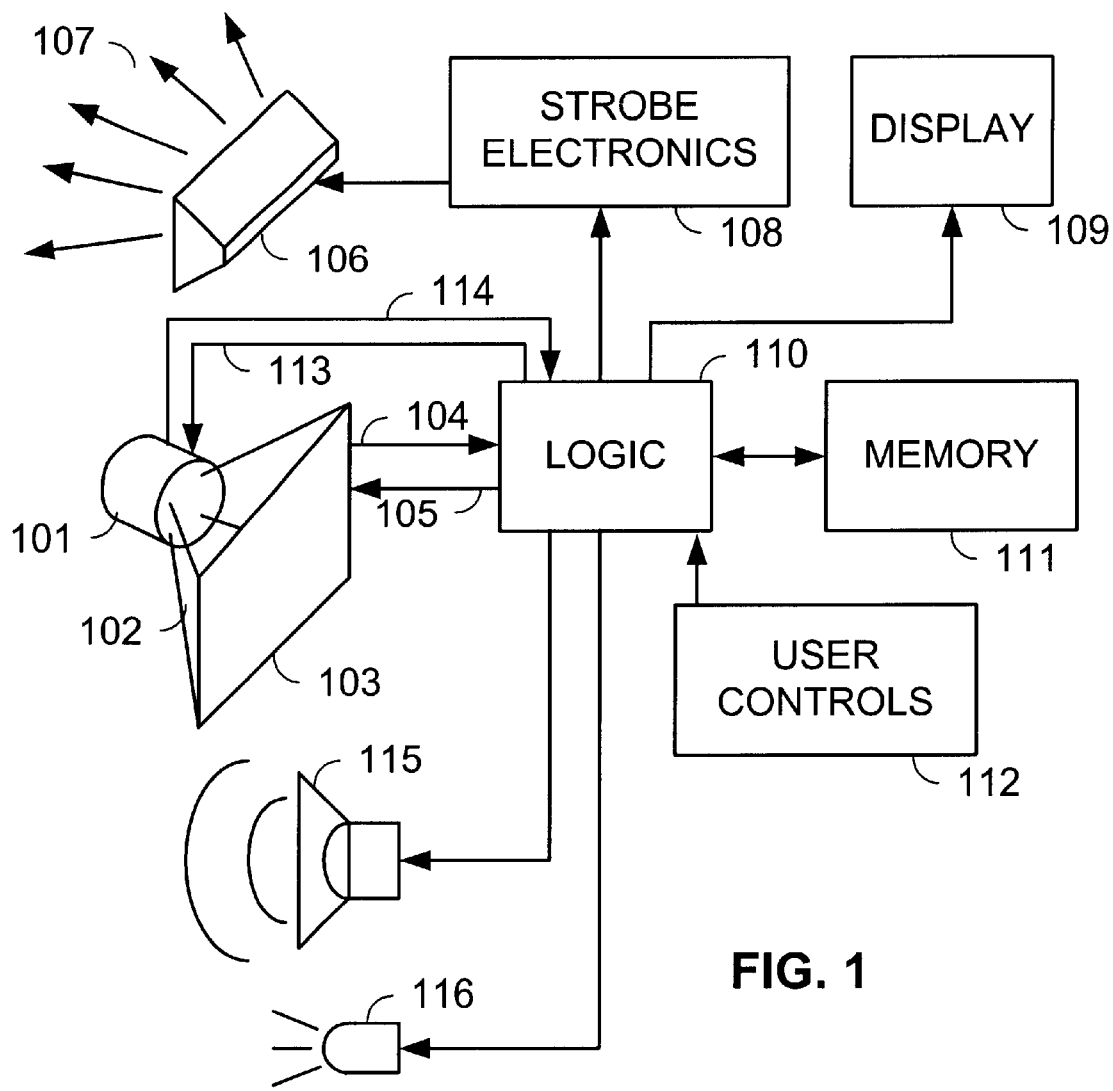
FIG. 1 is a simplified block diagram of a digital camera.

FIG. 1 shows a block diagram of a digital camera. The lens (101) gathers light from a scene (not shown). The gathered light is redirected (102) to form an image of the scene on an electronic array light sensor (103), which may be the main image sensor in a digital camera or a multipoint metering sensor in a film camera. The sensor may be an array of CCD elements, CMOS sensors, or the like. The operation of a focusing mechanism, which may include all or part of the lens (101), may be controlled by control signals (113) from a logic unit (110), which may contain a microprocessor system. Feedback signals (114) indicating the position of the focusing mechanism may flow from the lens (101) to the logic unit (110). Likewise the operation of the sensor may be controlled by control signals (105) from logic unit (110). Image information signals (104) flow from the sensor to the logic unit (110). A flash, or strobe (106) may be utilized to supply additional light (107) to the scene. The strobe is operated by the strobe electronics (108), which in turn are controlled by the logic unit (110). The camera may comprise a display (109) on which image data may be shown. The camera may comprise a memory (111) for storage and recall of image data, as well as data interchange with other devices (not shown). The user of the camera may operate various control inputs (112) in order to affect the operation of the camera.

The camera may also comprise a sound generating device (115) and an indicator light (116).

A digital camera by its nature produces a numerical representation of each photograph it takes. For each location in the photograph, called a "picture element" or "pixel", the camera records a numerical value indicating the brightness of the scene at that location. The resulting representation of the scene is then an array of numbers. Locations in the array correspond to specific pixels, or locations in the scene, and the number stored at each array location represents the scene brightness at that location. Optionally, the camera may also record information about the color at each pixel location of the scene being photographed. For example, many cameras represent the color of a pixel using three components indicating the contribution of red, green, and blue wavelengths of light to the brightness of that pixel. The overall brightness of a pixel may be computed as the sum of the red, green, and blue contributions, as a weighted sum, or as some other combination of the color information. A variety of methods for computing the brightness of a pixel from color information are well known in the art. It will be readily apparent to those skilled in the art that the present invention applies both to cameras that record only brightness information about each pixel and to cameras that also record color information.

For the purposes of this disclosure, a photograph may be a numerical representation of a scene captured by a camera, and need not be a printed representation of the scene.

Figure 2:
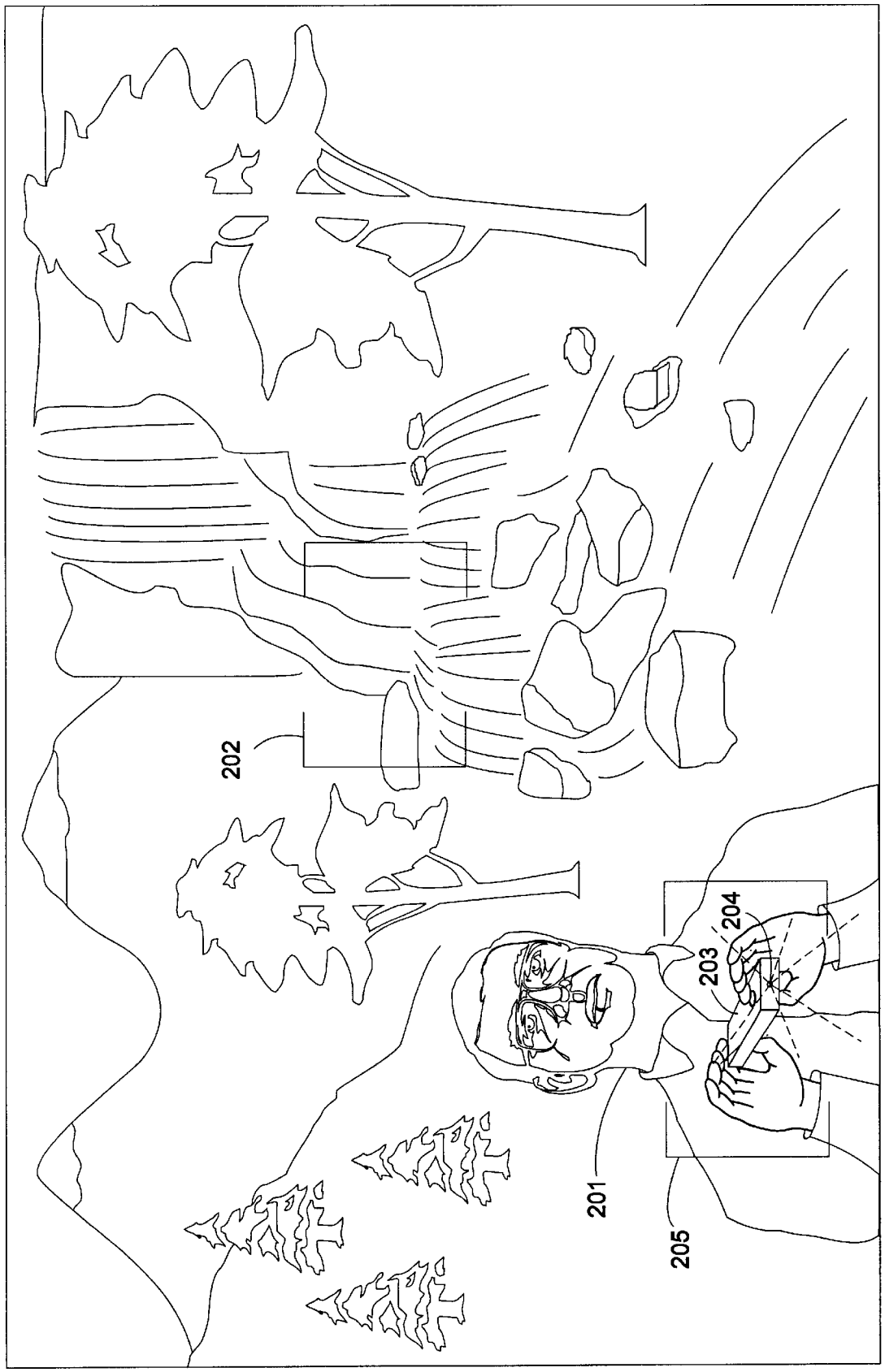
FIG. 2 depicts a scene to be photographed.

FIG. 2 is a schematic representation of a scene that will be used to illustrate an embodiment of the invention, as the scene might be seen through the viewfinder of a camera.

For the purposes of this disclosure, a camera viewfinder may be an optical device through which the photographer looks to frame the desired portion of the scene or it may be the image display portion of a digital camera used for the same purpose.

In the scene, a person (201) is both the photographer and a subject to be photographed. The person is positioned outside the usual focus region of the camera as indicated by brackets (202), and is holding a remote control (203). The remote control (203) comprises a light source (204). An alternate focus region that may be selected in accordance with an embodiment of the invention is indicated by brackets (205).

Figure 3:
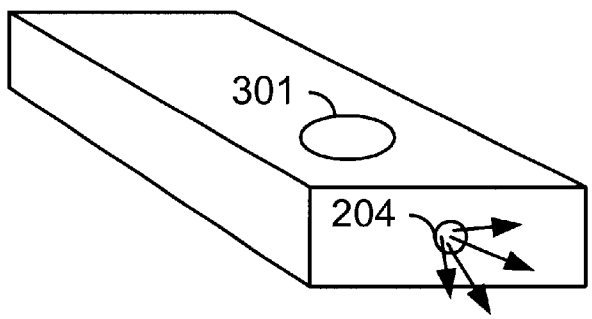
FIG. 3 depicts a camera remote control unit.

FIG. 3 depicts a remote control unit for a camera. The device may be of a size to be held in the user's hand, and produces a light signal from its light source (204) in response to the pressing of a button (301). The remote control unit could also be affixed to the user's clothing and actuated by a button (301) connected to the light source (204) by an unobtrusive wire. The light signal is composed of light wavelengths visible to the camera sensor (103), and may be monochromatic, polychromatic, constant, intermittent, or a combination of these. For example, the light signal could be a constant white light, a flashing yellow light, a light that periodically changes color, or could have some other combination of these that the camera can use to identify it. It is not necessary that the light signal be visible to or distinguishable by human senses. In an example embodiment, the light source will be described as a flashing white light for simplicity of explanation, but it will be recognized that other light signals could be used.

Figure 4A:
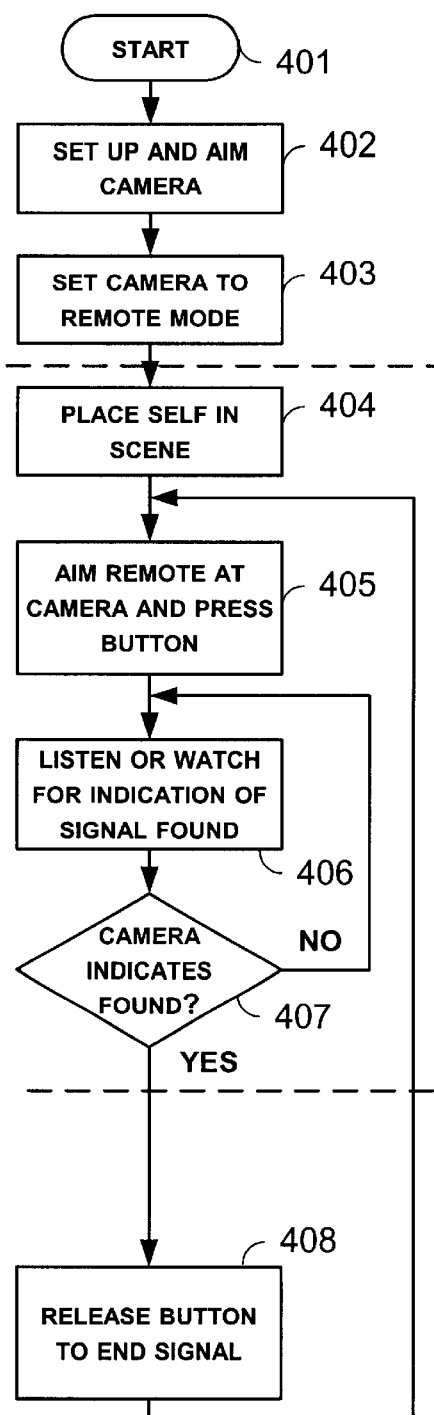
FIGS. 4A and 4B depict parallel flow charts of the processes followed by the photographer and by the camera in an example embodiment of the invention.
Figure 4A:
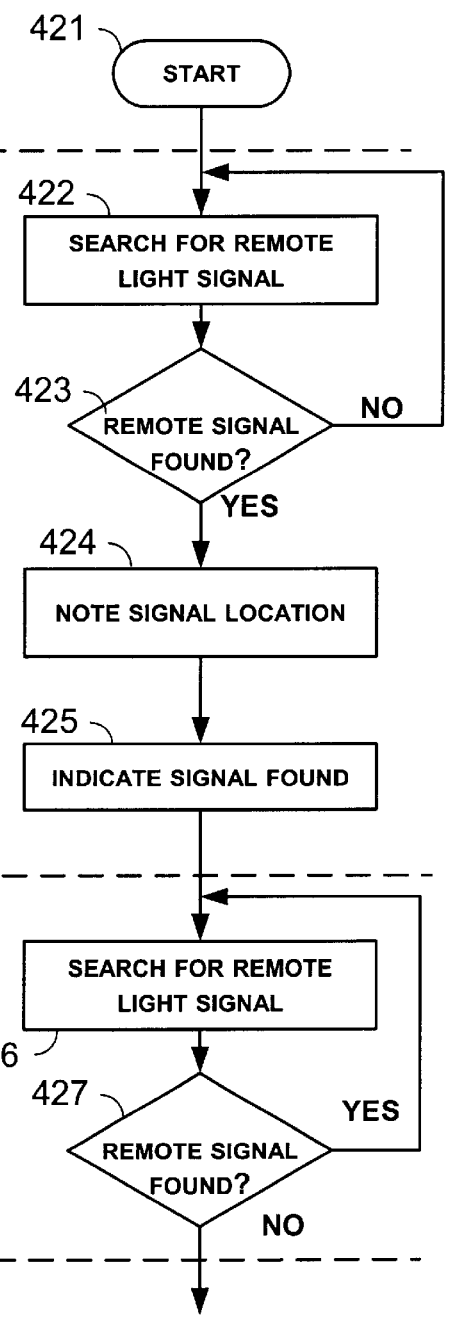
Figure 4B:
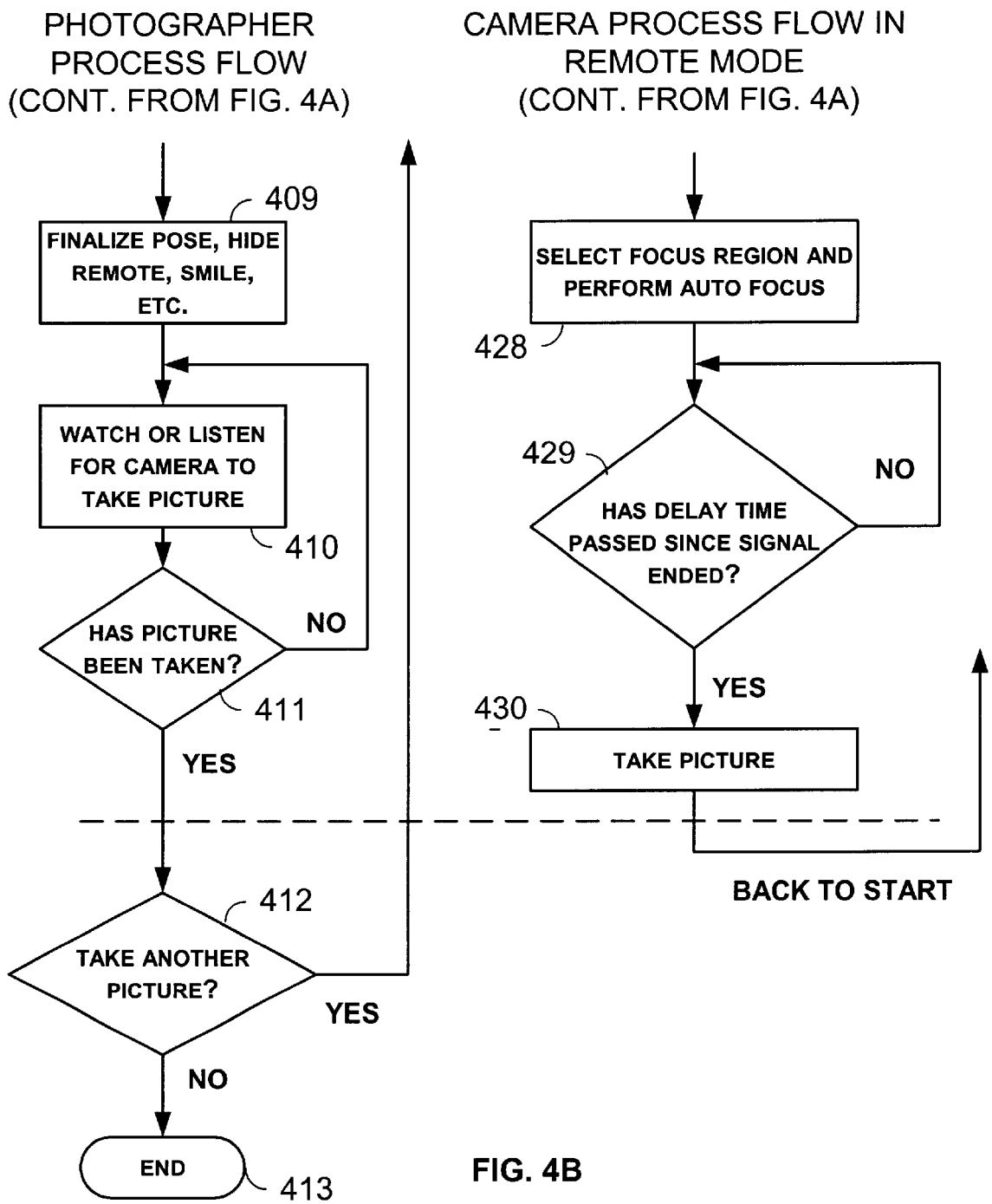

FIGS. 4A and 4B depict parallel flow charts of the processes followed by the photographer and the camera in an example embodiment of the invention. In steps (401) through (403), the photographer sets up the camera on a tripod or other support, aims the camera to frame the scene he desires to photograph, and operates a user control (112) to put the camera into a remote control mode. Upon being put into remote control mode (421) the camera begins searching (422, 423) for the light signal from the remote control. An example technique for this searching will be described in more detail below.

While the camera is searching for the light signal, the photographer places himself in the scene (404) and actuates the remote control (405) to initiate sending the light signal to the camera. The photographer then waits (406, 407) for an indication from the camera that the light signal has been detected.

Once the camera detects the light signal, it notes the location in its field of view where the light signal is found (424), and then may indicate to the photographer that the signal was detected (425). This indication may be done via a sound generating device (115) or an indicator light (116) or both or by some other means. The camera then waits (426, 427) for the light signal to stop.

Once the photographer receives the camera's indication that the light signal was received, he releases the remote control button (408), terminating the light signal and causing the camera to initiate its picture taking sequence.

The camera selects a focus region in its field of view in the area where the light signal was detected and performs its usual automatic focus function using photograph data from that region (428) to preferentially focus on objects in the vicinity of the remote control. At this point, the camera may delay (429) for a predetermined time to allow the photographer to finalize his pose and photograph composition. For example, the photographer may wish to slip the remote control device into a pocket so that it does not appear in the photograph. The photographer then waits for the photograph to be taken.

After the time delay has passed, the camera takes the photograph. It will be noted by those skilled in the art that other sequences are possible. For example, the camera may perform its automatic focus function during or after the delay time, or the delay time may be excluded altogether.

Once the photograph is taken, the camera resumes its searching for a light signal from the remote control in case the photographer wishes to take another photograph. The camera returns to its normal operation when the photographer operates the user controls (112) to exit the camera's remote operation mode.

After the photograph is taken, the photographer may simply initiate another photograph using the remote control device, or switch the camera out of its remote operation mode.

In this way, a remote control is used to obtain a photograph in which the photographer (who is also a photographic subject) is in proper focus, even though he may be positioned outside the normal focus region of the camera. The remote control device has "attracted" the focus region of the camera, as well as performed its usual function of initiating the camera's picture taking sequence.

Figure 5:
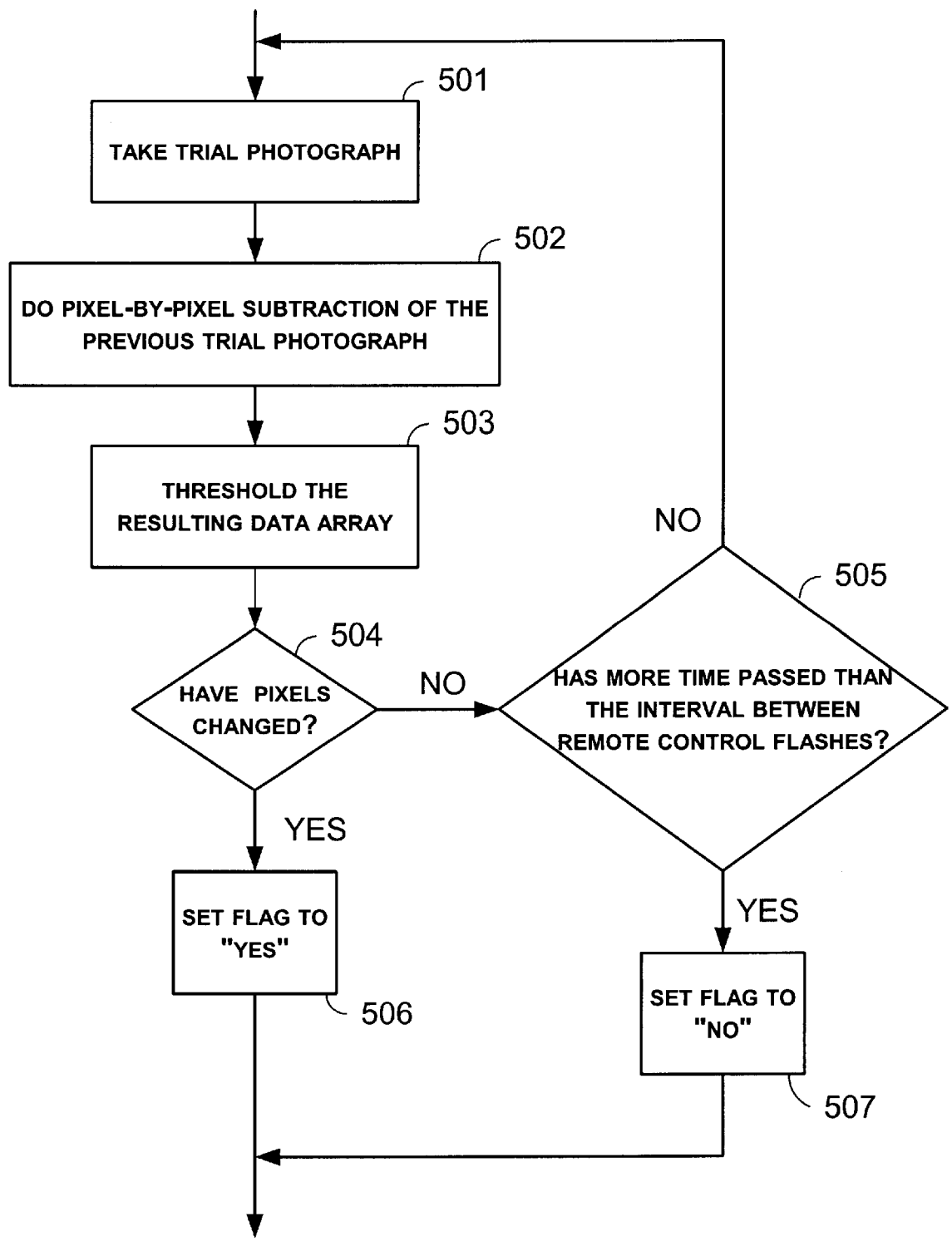
FIG. 5 depicts a flow chart describing in more detail how the camera searches for a light signal from the remote control.

FIG. 5 depicts a flow chart showing in more detail an example method that the camera can use to search for a signal from the remote control. In the example embodiment, the remote control light signal consists of a flashing white light containing wavelengths of light visible to the sensor in the camera, and flashing at a rate relatively slow compared to the rate at which the camera can take a trial photograph.

Figure 6:
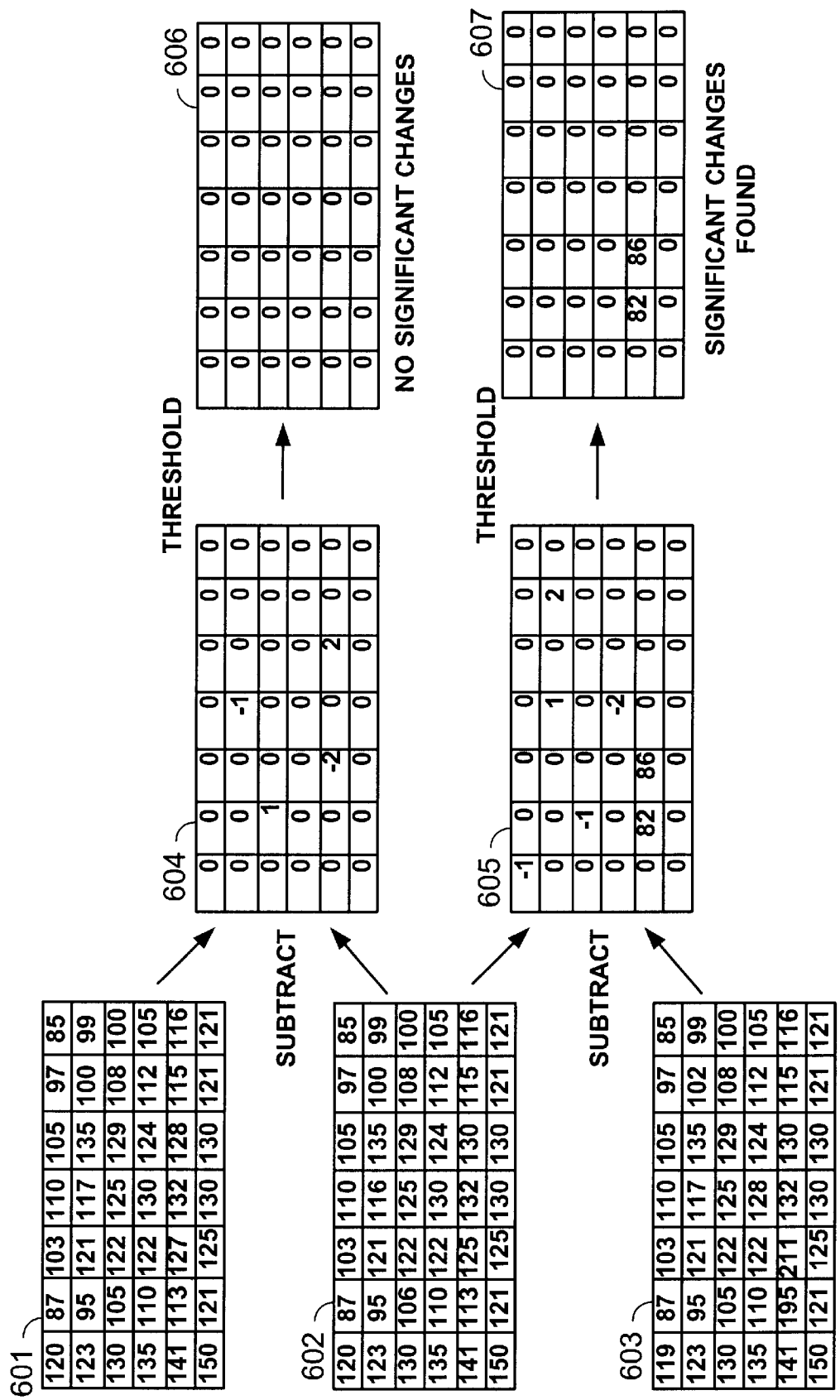
FIG. 6 depicts the calculations the camera may perform to detect a signal from the remote control in an example embodiment of the invention.

FIG. 6 depicts the calculations performed in some of the steps of FIG. 5.

In step 501, the camera takes a trial photograph of the scene. This generates an array of numbers (602), each representing the brightness of a part of the scene. This example array (602) is simplified and represents the scene with only a few elements for ease of explanation. The camera may use a different number of pixels in its trial photographs.

In step 502, the camera subtracts from array (602) another array of numbers (601) representing a trial photograph taken a short time earlier during an earlier iteration of the loop depicted in FIG. 5. The resulting array (604) contains numbers representing the changes in brightness of pixels in the scene between the two trial photographs.

In step 503, a thresholding operation is performed on array (604). A thresholding operation compares the magnitude of each array element to a "threshold" value. If the magnitude of an array element is less than the threshold value, that element is set to zero; otherwise the element is left unchanged. This operation has the effect of screening out insignificant changes in the scene that might be due to noise or slight motions of subjects in the scene. The thresholding operation results in array (606), which contains all zeros indicating that there were not significant changes in the scene between the two trial photographs.

Because no significant changes were detected and only a short time has passed, the camera traverses the loop of FIG. 5 -again, taking another trial photograph and constructing array (603). Array (602) is subtracted from array (603) resulting in array (605) which represents the changes in the scene between the most recent trial photographs. Array (605) is thresholded to produce array (607).

At this time, significant changes have been detected. A small area of the scene is much brighter than previously, indicating that the flashing light on the remote control has turned on. The camera records (506) a signal or flag indicating the remote control light signal has been detected.

If the loop of FIG. 5 is traversed without finding the light signal for a period of time longer than the interval between remote control light flashes, the camera records (507) a signal or flag indicating that the remote control light signal has not been detected.

FIG. 7 depicts a row and column numbering arrangement that the camera may use to locate the remote control light signal in its field of view. The pixels whose values changed significantly represent the location of the remote control light signal. An example technique for locating those pixels in array (607) is to find the centroid of the brightness values in the array. The centroid is found according to the formulae:

$$X_c = centroid\ X\ coordinate = \frac{\sum (brightness\ value) * (X\ location)}{\sum (brightness\ value)}$$

$$Y_c = centroid\ Y\ coordinate = \frac{\sum (brightness\ value) * (Y\ location)}{\sum (brightness\ value)}$$

where the summations are performed over the entire array. In the example presented above, $$X_c = \frac{(82*1)+(86*2)}{82+86} = 1.51$$

$$Y_c = \frac{(82*4)+(86*4)}{82+86} = 4$$

where pixels with brightness values of zero have been omitted from the calculation.

The remote control light signal has therefore been located at (X=1.51, Y=4) in the example array. The camera may then select its focus region in this vicinity, causing objects in that part of the camera's field of view to be in focus in the resulting photograph.

It will be appreciated that the camera remote control system described above provides a means whereby a photographer may use a remote control to take a photograph that includes the photographer himself, while ensuring that the desired parts of the photograph are in focus even though the subjects may be outside the usual focus region used by the camera for its automatic focus determination. The system is simple and reliable, requires only one light signal element, and allows the photographer to control the camera aperture setting as he prefers.

The foregoing description of the present invention has been presented for purposes of illustration and description. It is not intended to be exhaustive or to limit the invention to the precise form disclosed, and other modifications and variations may be possible in light of the above teachings. For example, rather than a single button, the camera remote control could be configured with two buttons, one labeled "attract focus" for initiating the light signal, and another labeled "take picture" instructing the camera to proceed with its picture taking sequence. Alternatively, two light signals could be provided—one visible to the camera array light sensor for locating the remote control unit, and a second light signal for initiating the camera's picture taking sequence. The second light signal could be of a different wavelength than the visible light signal, e.g. infrared, or distinguishable in some other way.

The example embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A camera system comprising:

a) a camera, and b) a remote control unit which generates a remote control light signal; the camera configured to sense the presence and location of the remote control light signal in the camera's field of view and to preferentially focus on objects in the vicinity of the remote control unit when taking a photograph, and wherein the presence of the remote control light signal initiates the process of the camera finding the location of the remote control light signal, and the subsequent absence of the remote control light signal initiates the camera's picture taking sequence.

2. The camera system of claim 1 wherein the camera signals its recognition of the termination of the light signal before initiating its picture taking sequence.

3. The camera system of claim 2 wherein the camera delays for a predetermined time after signaling its recognition of the termination of the light signal before taking a photograph.

4. A digital camera comprising an electronic array light sensor, the camera configured to sense the presence and location of a remote control light signal in the camera's field of view and to preferentially focus on objects in the vicinity of the remote control light signal, and wherein the same electronic array light sensor is used for locating the remote control light signal, for evaluating image contrast during focusing, and for taking a photograph.

5. The digital camera of claim 4 wherein sensing the presence of the remote control light signal comprises computing differences in pixel brightness values between successive trial photographs.

6. The digital camera of claim 5 wherein the differences in pixel brightness values between are compared with a threshold value.

7. The digital camera of claim 5 wherein sensing the location of the remote control light signal comprises computing a centroid of the differences in pixel brightness values.

8. The digital camera of claim 7 wherein only differences with magnitudes larger than a threshold value are considered in the computation of the centroid.

9. A method of sensing the presence of a remote control light signal by a digital camera, comprising the steps of:

a) taking successive trial photographs;

b) computing differences in pixel brightness values between the successive trial photographs; and c) recording an indication that the remote control light signal has been sensed when significant pixel brightness value differences are detected.

10. The method of claim 9 further comprising the step of comparing the differences in pixel brightness values with a threshold value.

11. A method of sensing the location of a remote control light signal in the field of view of a digital camera comprising the steps of:

a) taking successive trial photographs;

b) computing differences in pixel brightness values between the successive trial photographs; and c) computing a centroid of the differences in pixel brightness values.

12. The method of claim 11 further comprising the step of omitting from the computation of the centroid pixel brightness values whose magnitude is below a threshold value.

13. The method of claim 11 further comprising the step of selecting a focus region in the vicinity of the centroid.

* * * * *